United States Patent [19]
Kindig et al.

[11] Patent Number: 6,019,238
[45] Date of Patent: *Feb. 1, 2000

[54] HINGE ASSEMBLY FOR AN ENCLOSURE

[75] Inventors: Michael A. Kindig, Columbus; Kevin Scheifele, Cable, both of Ohio

[73] Assignee: Vita-Mix Corporation, Cleveland, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 09/009,716

[22] Filed: Jan. 20, 1998

[51] Int. Cl.$^7$ ....................................................... B65D 6/18
[52] U.S. Cl. ......................... 220/4.22; 16/266; 220/4.23; 220/836; 220/841
[58] Field of Search .................................. 220/4.22, 4.23, 220/4.24, 810, 848, 836, 845, 4.21, 813, 837, 840, 841, 831; 16/266; 206/308.3, 308.1, 309

[56] References Cited

U.S. PATENT DOCUMENTS

| | | | |
|---|---|---|---|
| D. 237,503 | 11/1975 | Langmack, Jr. | D26/5 R |
| D. 249,870 | 10/1978 | Tillander | D9/224 |
| D. 252,932 | 9/1979 | Felder | D16/11 |
| D. 295,012 | 4/1988 | Gelber | D7/412 |
| 1,931,016 | 10/1933 | Bridges | 220/813 X |
| 1,997,043 | 4/1935 | Clark | 220/813 X |
| 2,701,618 | 2/1955 | Montgomery | 181/33 |
| 2,948,430 | 8/1960 | Teague, Jr. et al. | 220/592.25 |
| 3,204,852 | 9/1965 | Capucio | 229/20 |
| 3,333,726 | 8/1967 | Belanger | 16/266 X |
| 3,390,804 | 7/1968 | Morgan | 220/212 |
| 3,424,510 | 1/1969 | Moon | 16/266 X |
| 3,451,580 | 6/1969 | Husby | 220/836 X |
| 4,545,484 | 10/1985 | Rohner | 206/308.3 X |
| 4,550,798 | 11/1985 | Swartz et al. | 181/201 |
| 4,598,824 | 7/1986 | Long et al. | 220/831 |
| 4,640,416 | 2/1987 | Northrup et al. | 206/308.3 X |
| 4,697,704 | 10/1987 | Curry | 206/308.3 |
| 4,759,443 | 7/1988 | Egly | 206/308.3 X |
| 4,798,284 | 1/1989 | Wakelin | 206/308.3 X |
| 5,205,401 | 4/1993 | Weisburn et al. | 220/4.22 X |
| 5,205,413 | 4/1993 | Cautereels et al. | 220/4.21 X |
| 5,205,625 | 4/1993 | Koch | 312/9.55 X |
| 5,265,310 | 11/1993 | Ichinokawa | 16/266 |
| 5,533,797 | 7/1996 | Gelber | 312/138.1 |

*Primary Examiner*—Allan N. Shoap
*Assistant Examiner*—Joe Merek
*Attorney, Agent, or Firm*—Renner, Kenner, Greive Bobak, Taylor & Weber

[57] ABSTRACT

An enclosure (20) includes a base component (21) attachable to a cover component (22) by a hinge assembly (23). The hinge assembly (23) includes lugs (36) carried by the base component (21) and apertures (40) formed in the cover component (22). Each lug (36) has opposed linear edges (38) and opposed arcuate edges (39). Each aperture (40) includes an access opening (41) which leads into a generally circular recess (42). The hinge assembly (23) can be connected or disconnected by aligning the linear edges (38) of the lugs (36) with the access openings (41). Upon rotation of the cover component (22) relative to the base component (21), the arcuate edges (39) of the lugs (36) are received within the circular recesses (42) of the apertures (40).

16 Claims, 6 Drawing Sheets

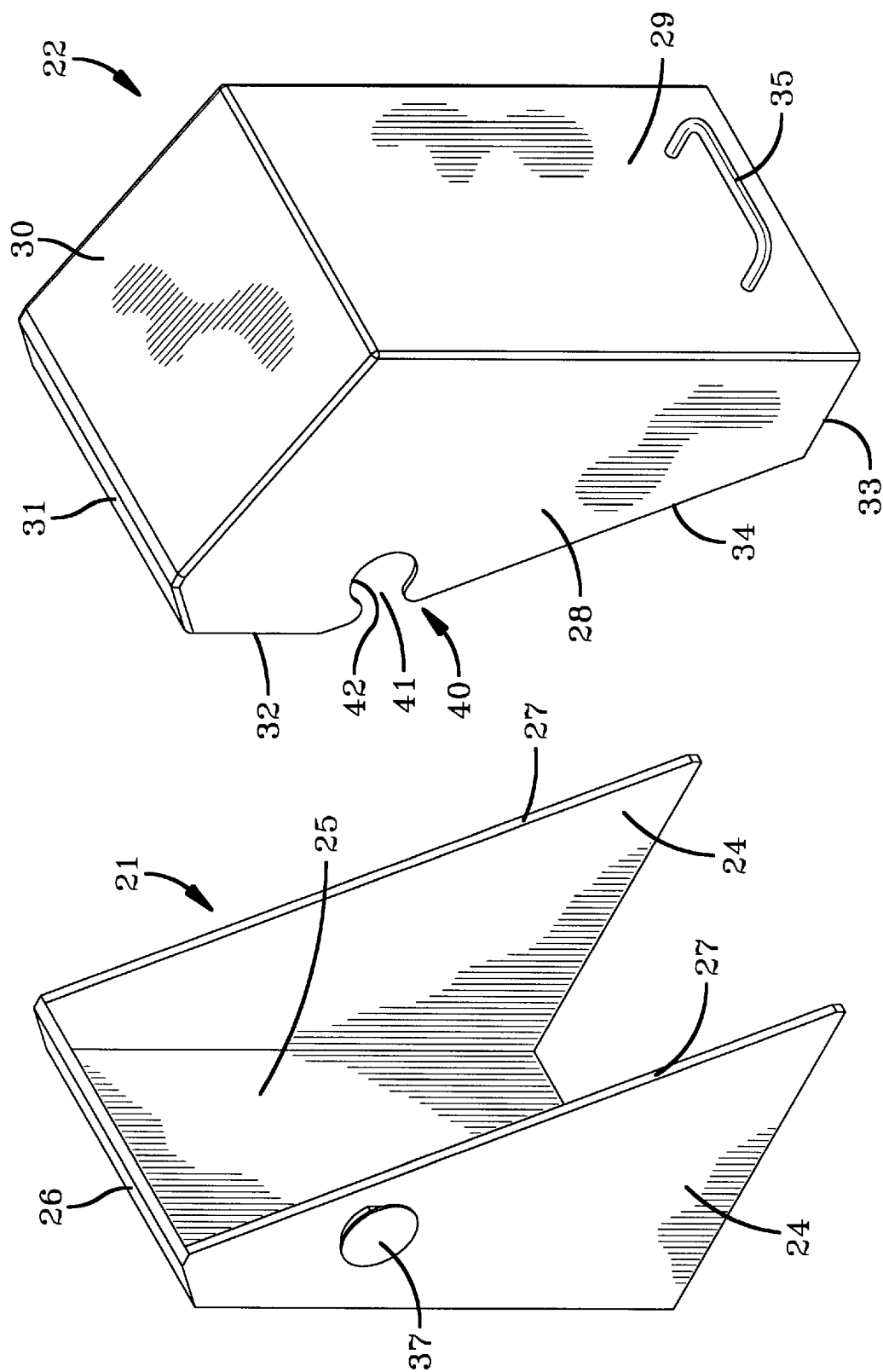

6,019,238

1

HINGE ASSEMBLY FOR AN ENCLOSURE

TECHNICAL FIELD

This invention relates to an enclosure, for example, of the type which might be utilized to house a blender or a food processor to deaden the noise emanating therefrom. More particularly, this invention relates to an enclosure having two components connected by a hinge assembly whereby the hinged connection can be readily disconnected to separate the components.

BACKGROUND ART

Innumerable types of cabinets or enclosures are known in the art. Some such cabinets, for example, are utilized to house electronic stereo equipment or the like. Recently, similar cabinets have been utilized to house the typical electric blender so that when the blender is in operation, the noise emanating therefrom will be muffled. Such is particularly desirable when the blender is being operated in a commercial environment, such as a restaurant, so that the patrons are not annoyed by the sound of a blender processing a beverage.

In some such enclosures, a cover may merely be lifted from its base to gain access to the item housed in the enclosure. More conveniently, however, the cover is usually hinged to the base of the enclosure. While such an arrangement renders use of the enclosure simpler, the permanent hinge arrangement makes cleaning of the enclosure a more difficult task. Moreover, such an arrangement can make it more difficult to place items into and remove items from the enclosure.

Thus, the need exists for an enclosure which has its cover and base components hinged together for convenient operation, and yet which can have the hinged connection readily disconnected for easier access to the inside of the enclosure.

DISCLOSURE OF THE INVENTION

It is thus an object of the present invention to provide an enclosure having a unique hinge assembly.

It is another object of the present invention to provide an enclosure, as above, wherein the cover of the enclosure, which is attached to the base of the enclosure by the hinge assembly, may be removed from the base by disconnecting the hinge connection.

It is a further object of the present invention to provide an enclosure, as above, in which the components of the hinge assembly are configured such that at one relative position thereof the cover may be removed from the base, and at all other relative positions thereof, the cover may be rotated relative to the base on the hinge assembly.

It is an additional object of the present invention to provide an enclosure, as above, which is easy to manufacture, to assemble, and to clean.

These and other objects of the present invention, as well as the advantages thereof over existing prior art forms, which will become apparent from the description to follow, are accomplished by the improvements hereinafter described and claimed.

In general, an enclosure made in accordance with the present invention includes a base component, a cover component, and a hinge assembly adapted to connect the cover component to the base component. The hinge assembly includes a lug formed on one of the components and an

2 aperture formed in the other component. The lug and the aperture are configured such that in one relative position of the components the cover component can be removed from the base component and in all other relative positions the cover component is maintained on the base component and can be rotated relative to the base component on the hinge assembly.

A preferred exemplary enclosure incorporating the concepts of the present invention is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 2 is a perspective view of the base component of the enclosure shown in FIG. 1.

FIG. 3 is a perspective view of the cover component of the enclosure shown in FIG. 1.

PREFERRED EMBODIMENT FOR CARRYING OUT THE INVENTION

Figure 1:
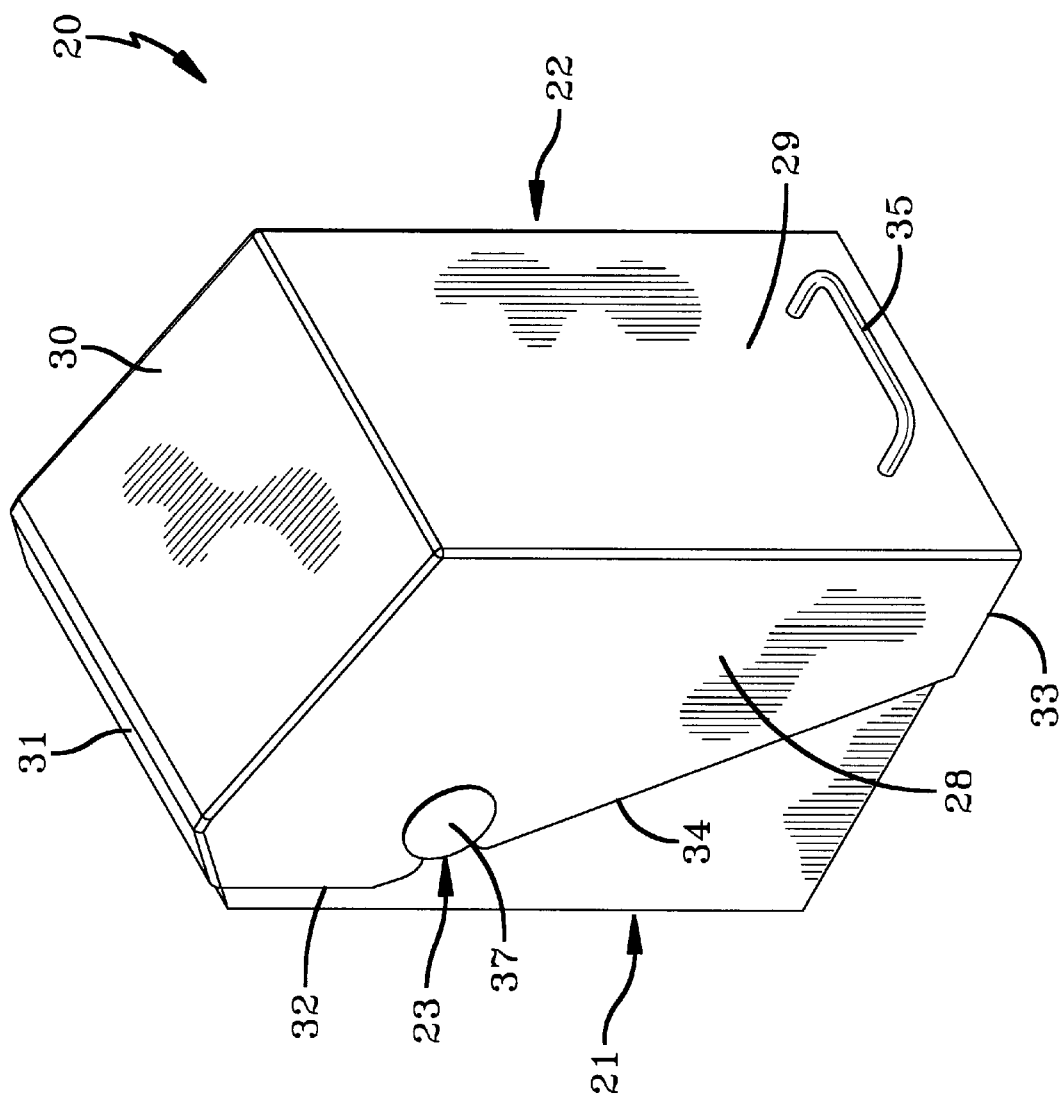
FIG. 1 is perspective view of an assembled enclosure made in accordance with the concepts of the present invention.

An enclosure made in accordance with the concepts of the present invention is indicated generally by the numeral 20 in the accompanying drawings. Enclosure 20 includes a base component indicated generally by the numeral 21, a cover component indicated generally by the numeral 22, and hinge assemblies indicated generally by the numeral 23. Enclosure 20 is suitable to house any type of item to which access is required during use, and is particularly suitable to house an electric food blender to reduce the sound emanating therefrom during operation. Both base component 21 and cover component 22 are preferably formed of a clear plastic material so that the item being housed therein can be readily observed.

Base component 21 includes opposed side walls 24 connected at their back by a generally vertical rear wall 25 and at their top by an upper lip 26. Walls 24 are generally in the form of a right triangle having front edges 27 extending angularly from the front of lip 26 to the bottom of walls 24. It should be noted that each upper lip portion 26 forms a truncated portion above the hinge assembly 23 such that each upper lip portion 26 is not parallel with any of edges of the respective sidewall 24 in which each upper lip portion is disposed. The space between walls 24 is thus suitable to receive the item to be housed in enclosure 20. A bottom surface may optionally extend between the bottom of walls 24, but the base component 21 shown has no such surface. Rather, base component 21 may merely be placed on a flat surface, such as a counter top, and the item to be housed therein is placed on such counter top.

Cover component 22 includes opposed side walls 28 connected at their front by a generally vertical front wall 29 and at top by a top surface 30 which extends angularly upwardly from the top of front wall 29 to an upper lip 31. Side walls 28 are configured to have a generally vertical upper edge 32 extending downwardly from lip 31, a generally horizontal lower edge 33 extending rearwardly from front wall 29, and an angular central edge 34 extending between edges 32 and 33. The distance between walls 28 is slightly larger than the distance between side walls 24 of base component 21 so that cover component 22 can be telescopically received over base component 21. A handle 35 may be provided on front wall 29 so that cover component 22 may be easily rotated relative to base component 21 on hinge assemblies 23 which will now be described in detail.

Figure 5:
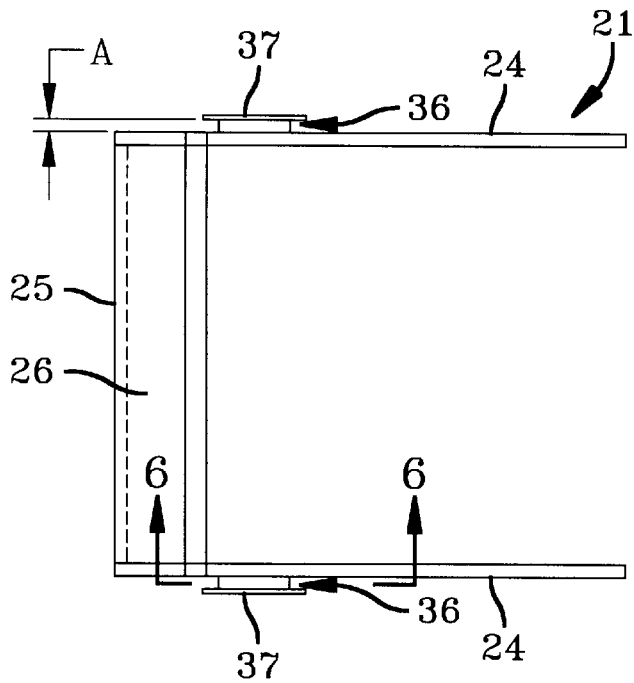
FIG. 5 is a top plan view of the base component shown in FIG. 2.
Figure 6:
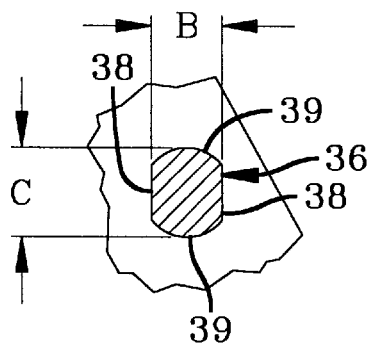
FIG. 6 is a fragmented sectional view taken substantially along line 6—6 of FIG. 5.
Figure 4:
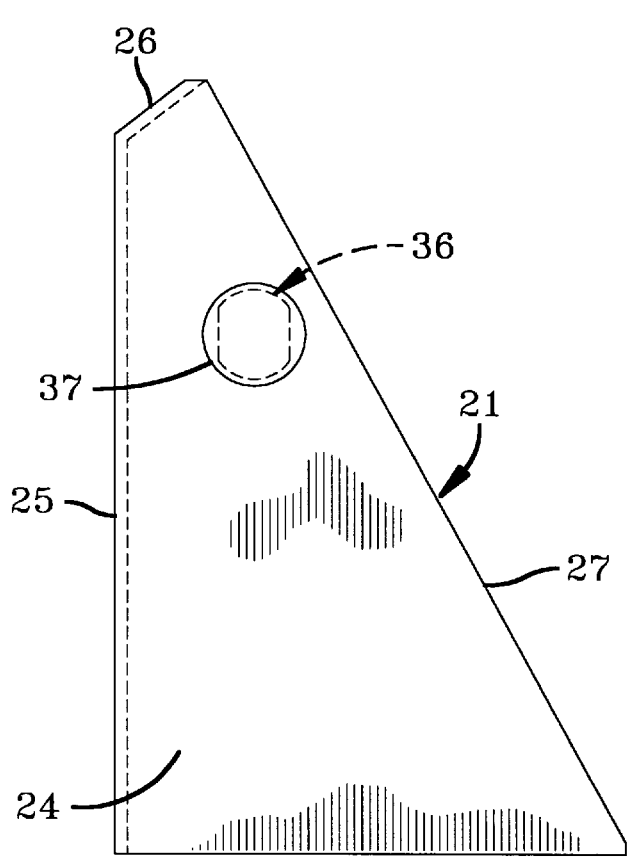
FIG. 4 is a side elevational view of the base component shown in FIG. 2.
Figure 8:
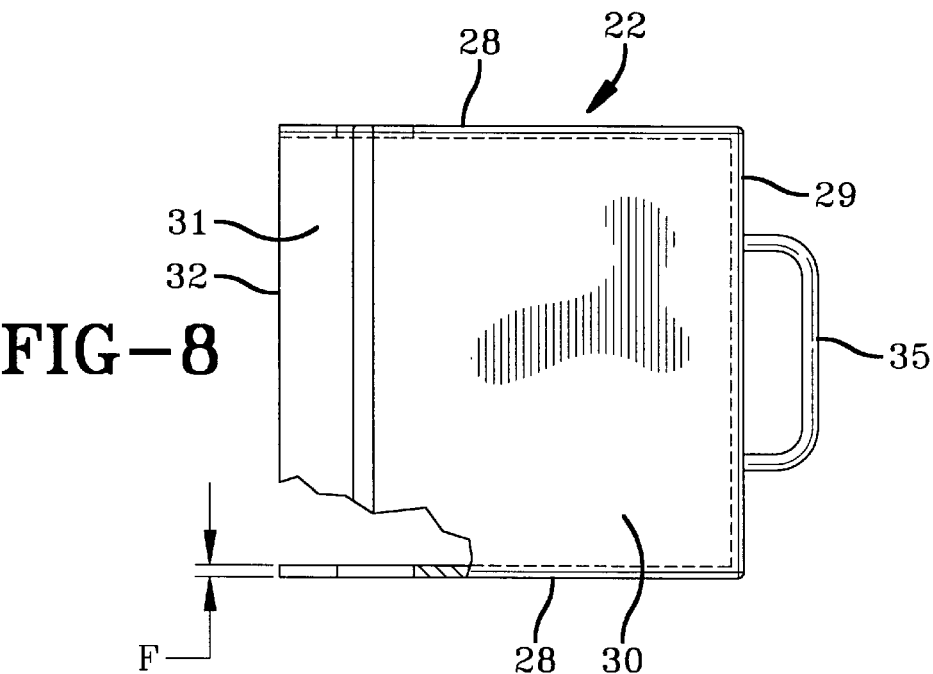
FIG. 8 is a top plan view of the cover component shown in FIG. 3.
Figure 7:
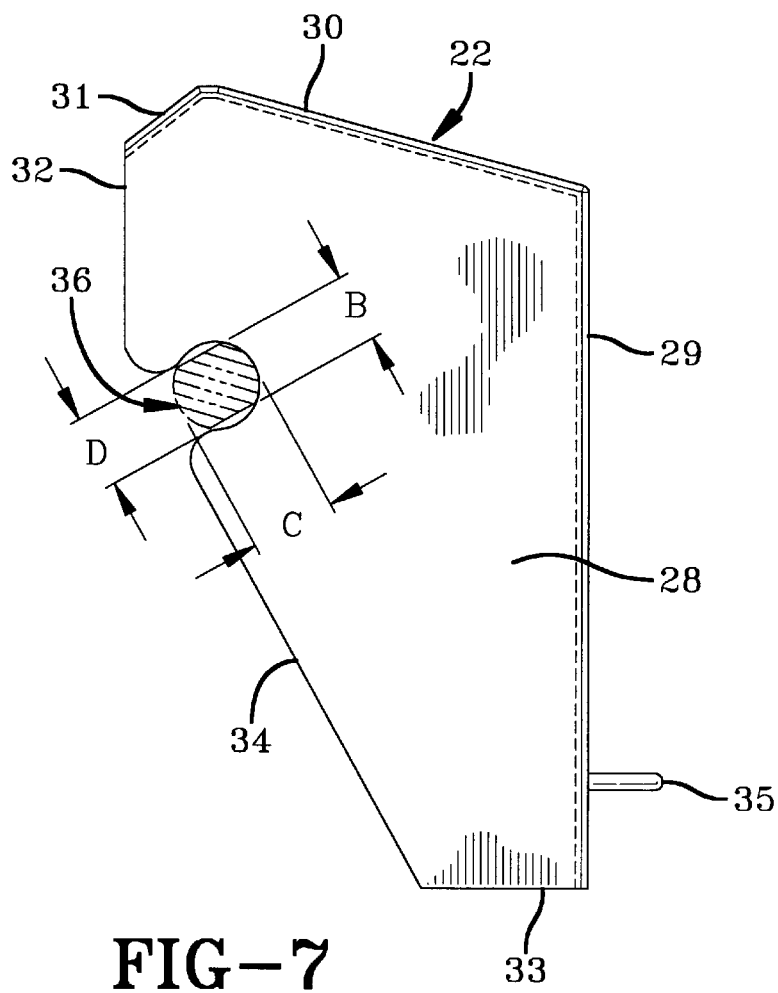
FIG. 7 is a side elevational view of the cover component shown in FIG. 3 and showing a lug component of the hinge assembly on the base component in section.
Figure 9:
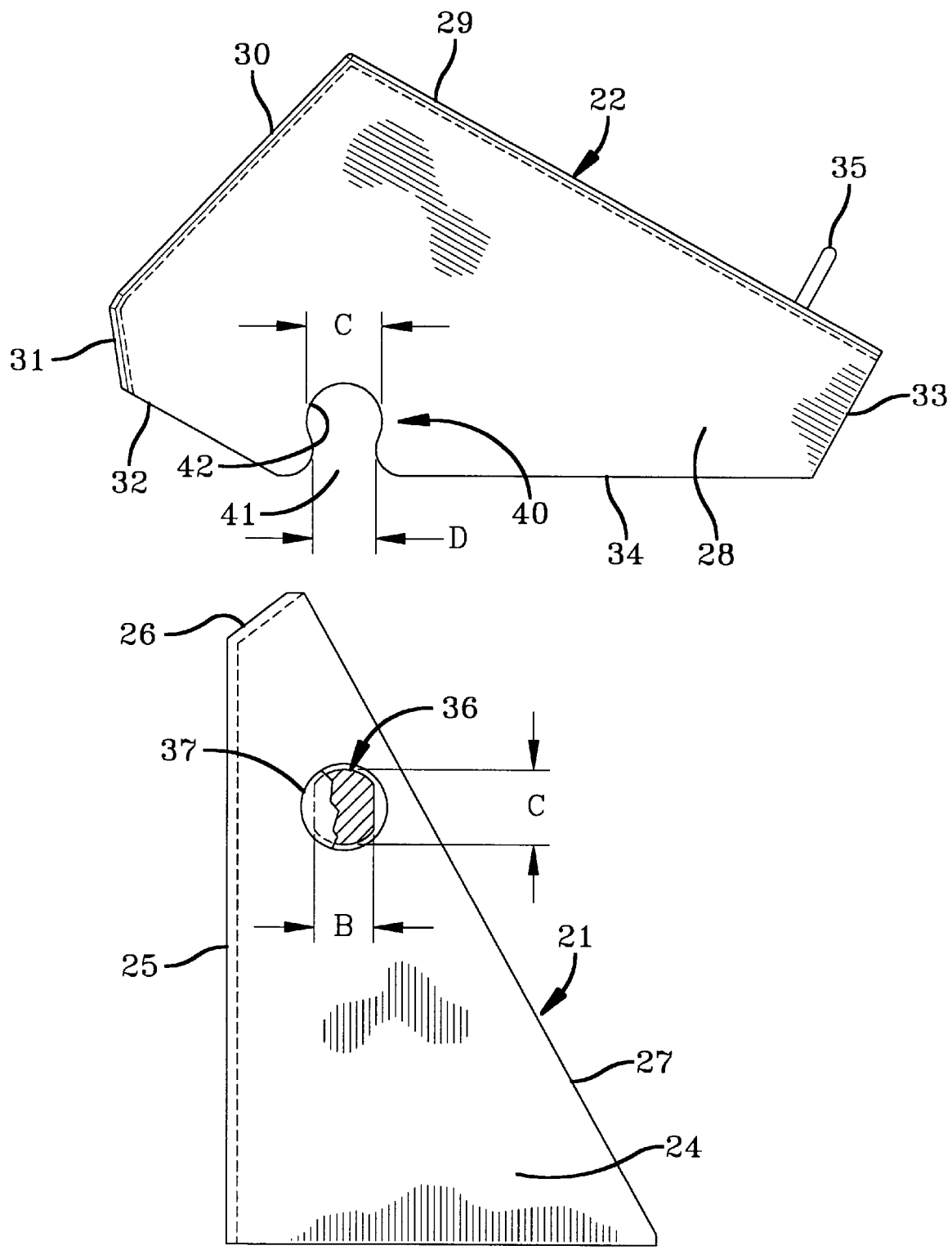
FIG. 9 is an elevational view of the cover component and base component showing the manner in which they are assembled to connect the hinge assembly, the lug component of the hinge assembly being shown in section.

A hinge assembly 23 is formed on each side of enclosure 20. Each hinge assembly 23 includes a lug, generally indicated by the numeral 36, extending outwardly from each side wall 24 of base component 21. A circular button 37 may be formed at the outer end of each lug 36 and is thus spaced from side wall 24 by dimension A (FIG. 5). As best shown in FIG. 6, each lug 36 is formed with opposed, spaced linear edges 38 connected by opposed, spaced arcuate edges 39. Linear edges 38 are spaced by a dimension B and the apex of arcuate edges 39 are spaced by a dimension C which is greater than dimension B.

Each hinge assembly 23 also includes an aperture, generally indicated by the numeral 40, formed in each side wall 28 of cover component 22. Each aperture 40 is formed generally near the junction of upper edge 32 and central edge 34 of side walls 28 of cover component 22, and is generally keyhole-shaped having an access opening 41 formed in edge 34 leading to a generally circular recess 42 in wall 28. The width of access opening 41, that is, dimension D, is generally the same as dimension B of lugs 36 so that when cover component 22 is positioned so that dimension D of apertures 40 are aligned with linear edges 38 of lugs 36 of base component 21, lugs 36 may be received in apertures 40. In this regard, dimension D is preferably slightly larger than dimension B, but dependent on the flexibility of the material of cover component 22, dimension D could even be slightly smaller than dimension B and lugs 36 could then snap into apertures 40 which would flex slightly in so doing. The diameter E of recess 42 is designed to generally coincide with, and preferably be only slightly larger than, dimension C of lugs 36. When hinge assembly 23 is assembled, walls 28 of cover component 22, which have a thickness of dimension F, fit between walls 24 and buttons 37 of base component 21. As such, dimension A, previously described, is slightly larger than thickness F of walls 24. It should be appreciated that buttons 37 are not critical to the proper operation of hinge assemblies 23. While serving to assure that cover component 22 remains on base component 21, by manufacturing these components with precise tolerances, or even by extending the length of lugs 36, buttons 37 could be eliminated.

Figure 10:
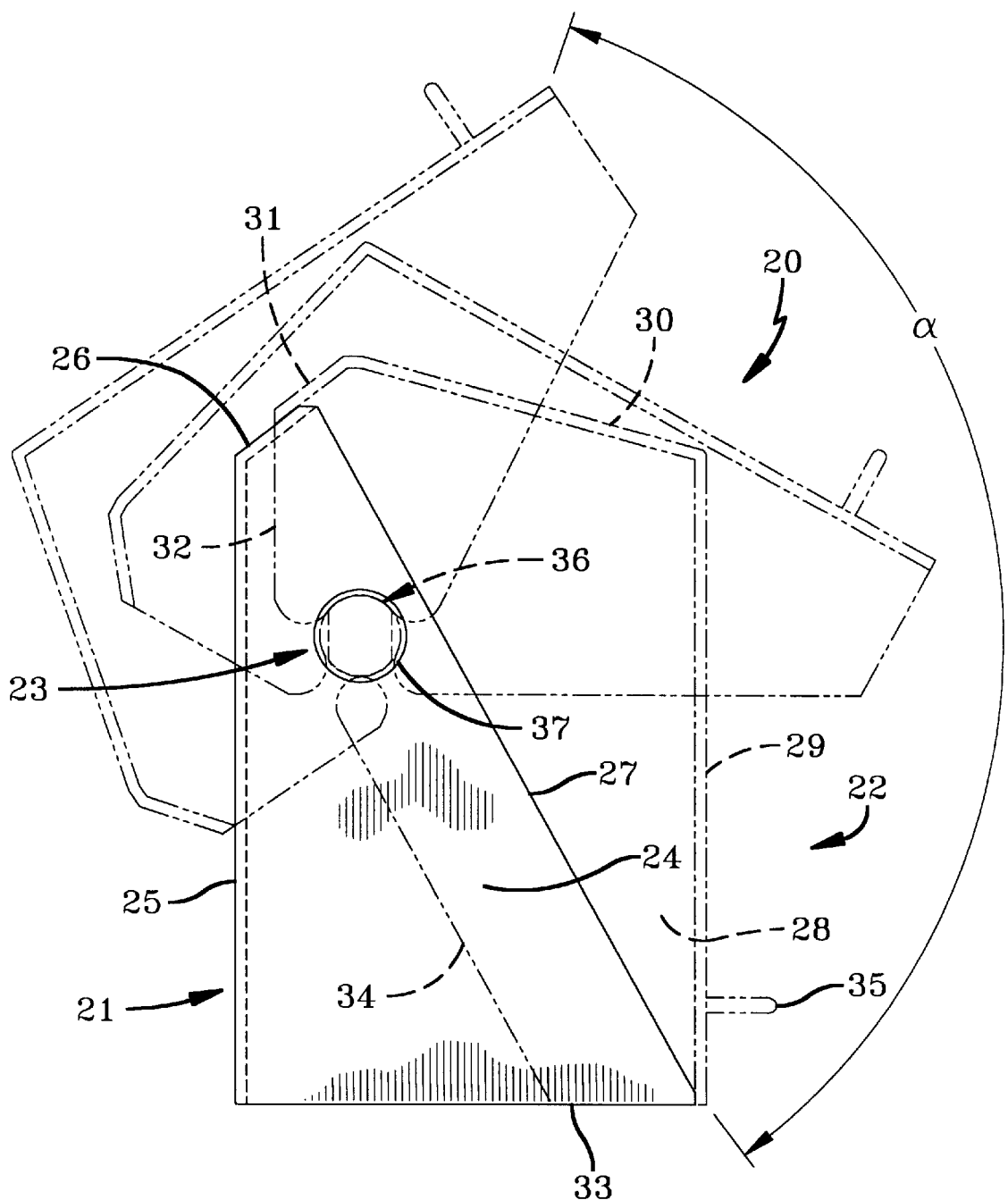
FIG. 10 is a somewhat schematic representation of the manner in which the cover component may be rotated relative to the base component on the hinge assembly.

As previously described, only when openings 41 are aligned with linear edges 38 of hinge assembly 23 can base component 21 be connected to, or disconnected from, cover component 22. Then, rotating cover component 22 relative to base component 22, maintains these components together on hinge assembly 23 as arcuate edges 39 of lugs 36 ride in generally circular recesses 42 of apertures 40. Thus, as shown in FIG. 10, cover component 22 may be rotated on an arc a from the fully closed position shown in FIG. 1 to the fully open position whereby the upper lip 31 of cover component 22 engages rear wall 25 of base component 21. Only when cover component 22 is generally midway through arc α, when central edge 34 is generally horizontal, can it be removed from base component 21. It should be understood that the same result would occur if lugs 36 were positioned on cover component 22 and apertures 40 were formed in base component 21, which is contemplated by this invention.

In view of the foregoing, it should thus be evident that an enclosure constructed as described above accomplishes the objects of the present invention and substantially improves the art.

What is claimed is:

1. An enclosure comprising a base component having spaced side walls joined by a rear wall and by an upper lip portion, a cover component having a downwardly directed upper portion, and a hinge assembly connecting said cover component to said base component such that said cover component can be pivoted from a position closing said base component to a fully open position exposing said rear wall, said downwardly directed upper portion at least partially overlying said upper lip portion of said base component when said cover component is in the position closing said base component, said downwardly directed upper portion having an edge engaging said rear wall when said cover component is moved to said fully open position, said engagement being the only support for said cover component in said fully open position, said hinge assembly including a lug formed on one of said components and an aperture formed in the other of said components, said lug and said aperture being oriented such that in one relative position of said components during the pivoting of said components relative to each other, said cover component can be removed from said base component and in all other relative positions said cover component is maintained on said base component, said spaced side walls of said base component being substantially right triangles with a truncated portion disposed above said hinge assembly and defining said upper lip portion, each said upper lip portion not being parallel with any of the formed edges of the respective side wall in which each said upper lip portion is disposed.

2. An enclosure according to claim 1 wherein said lug includes opposed, spaced, generally linear edges.

3. An enclosure according to claim 2 wherein said aperture includes an access opening of a dimension approximating the spacing of said linear edges, said dimension of said access opening being aligned with said linear edges of said lug when in said only one relative position of said components.

4. An enclosure according to claim 3 wherein said lug includes opposed, spaced, generally arcuate edges, the spacing of the apex of said arcuate edges being greater than the spacing of said linear edges.

5. An enclosure according to claim 4 wherein said aperture includes a generally circular recess adjacent to said access opening, said recess being of a diameter approximately the same as the spacing of the apex of said arcuate edges.

6. An enclosure according to claim 1 wherein said cover component is telescopically received over said base component and said hinge assembly includes a button formed on the end of said lug and spaced from said base component, a portion of said cover component being received in the space between said button and said base component.

7. An enclosure according to claim 1, said base component having side walls, each said side wall having a said lug thereon.

8. An enclosure according to claim 7, said cover component having side walls, each said side wall of said cover component having a said aperture formed therein.

9. An enclosure according to claim 8 wherein said hinge assembly includes a button formed on the outer end of each said lug, each said button being spaced from each said side wall of said base component, each said side wall of said cover component being received in the space between each said button and each said side wall of said base component.

10. An enclosure according to claim 8 wherein each said lug includes opposed, spaced, generally linear edges.

11. An enclosure according to claim 10 wherein each said aperture includes an access opening in each said side wall of said cover component and having a dimension approximating the spacing of said linear edges of each said lug.

12. An enclosure according to claim 11 wherein each said lug includes opposed, spaced, generally arcuate edges, the spacing of the apexes of said arcuate edges being greater than the spacing of each of said linear edges.

13. An enclosure according to claim 12 wherein each said aperture includes a generally circular recess adjacent to each said access opening, each said recess being of a diameter approximately the same as the spacing of each apex of each said arcuate edge.

14. An enclosure comprising a base component, said base component having spaced side walls joined by a rear wall and by an upper lip portion, a cover component, said cover component having spaced side walls joined by a front wall, and by a top wall having a downwardly directed lip portion, the space between said side walls of said cover component being greater than the space between said side walls of said base component so that when said cover component is on said base component, said downwardly directed lip portion at least partially overlies said upper lip portion, a hinge assembly, said hinge assembly including lugs formed on said side walls of said base component and apertures formed in said side walls of said cover component, said lugs being received in said apertures when said side walls of said cover component are received over said side walls of said base component so that said cover component can be rotated relative to said base component on said hinge assembly from a position closing said base component to a fully open position, such that when in said fully open position, an edge of said downwardly directed lip portion engages said rear wall, said spaced side walls of said base component being substantially right triangles with a truncated portion disposed above said hinge assembly and defining said upper lip portion, each said upper lip portion not being parallel with any of the formed edges of the respective side wall in which each said upper lip portion is disposed.

15. An enclosure according to claim 14 further comprising a handle on said front wall.

16. An enclosure comprising a first member having spaced first and second side walls, said first member including a front surface of the enclosure extending between said first and second side walls and a top surface of the enclosure extending between said first and second side walls, said top surface having a downwardly directed portion; a second member having spaced first and second side walls, said second member including a back surface of the enclosure, said back surface having a lip portion; and a hinge assembly connecting said first side wall of said first member to said first side wall of said second member, and connecting said second side wall of said first member to said second side wall of said second member; said first member being moveable on said hinge assembly relative to said second member from a closed position, where said first side wall of said first member telescopes over said first side wall of said second member and said second side wall of said first member telescopes over said second side wall of said second member, and wherein said downwardly directed portion is received over said lip portion, to an open position exposing said back surface of said second member; said hinge assembly being configured so that said first side wall of said first member can be disconnected from said first side wall of said second member, and said second side wall of said first member can be disconnected from said second side wall of said second member only at one position between said closed and open positions, said spaced side walls of said second member being substantially right triangles with a truncated portion disposed of said hinge assembly and defining said lip portion, each said lip portion not being parallel with any of the formed edges of the respective sidewall wall in which each said lip portion is disposed.

\* \* \* \* \*